(12) United States Patent
Whitworth

(10) Patent No.: US 11,081,022 B2
(45) Date of Patent: Aug. 3, 2021

(54) INSTRUCTIONAL BOARD FOR KNITTING

(71) Applicant: Joyce Whitworth, Hilliard, FL (US)

(72) Inventor: Joyce Whitworth, Hilliard, FL (US)

( * ) Notice: Subject to any disclaimer, the term of this patent is extended or adjusted under 35 U.S.C. 154(b) by 0 days.

(21) Appl. No.: 16/864,574

(22) Filed: May 1, 2020

(65) Prior Publication Data
US 2020/0402422 A1 Dec. 24, 2020

Related U.S. Application Data

(60) Provisional application No. 62/865,619, filed on Jun. 24, 2019.

(51) Int. Cl.
G09B 19/20 (2006.01)
G09B 19/00 (2006.01)

(52) U.S. Cl.
CPC ........... *G09B 19/20* (2013.01); *G09B 19/003* (2013.01)

(58) Field of Classification Search
CPC .......... G09B 19/00; G09B 19/20; B42D 3/18; B42D 25/351
USPC ................................ 434/95, 96, 98; 283/115
See application file for complete search history.

(56) References Cited

U.S. PATENT DOCUMENTS

| | | | | |
|---|---|---|---|---|
| 2,317,673 A * | 4/1943 | Gilbert | ....................... | G09F 5/04 434/98 |
| 2,624,455 A * | 1/1953 | Myers | ..................... | A47F 5/112 206/45.27 |
| 2,878,814 A * | 3/1959 | Consaul | .................. | B42F 17/00 40/359 |
| 3,363,349 A * | 1/1968 | Nelson | ..................... | B42F 17/18 40/391 |
| 3,434,227 A * | 3/1969 | Brown, Jr. | .............. | G03F 3/101 434/98 |
| 3,575,120 A * | 4/1971 | Paulson | ................... | D05B 3/24 112/136 |
| 3,871,115 A * | 3/1975 | Glass | ..................... | G09B 19/08 434/157 |
| 4,391,591 A * | 7/1983 | Hamburger | .............. | D04B 3/00 434/95 |
| 4,520,749 A | 6/1985 | Jefferson | | |
| 4,578,036 A | 3/1986 | Leighton | | |
| 4,792,305 A | 12/1988 | O'Donnell | | |
| 5,393,157 A * | 2/1995 | Basmajian | .............. | B42F 13/40 206/308.3 |
| 5,788,503 A * | 8/1998 | Shapiro | .................... | G09B 1/00 434/167 |
| 5,882,038 A * | 3/1999 | Ong | ......................... | B42F 7/04 281/31 |

(Continued)

*Primary Examiner* — Kurt Fernstrom
(74) *Attorney, Agent, or Firm* — Boudwin Intellectual Property; Daniel Boudwin

(57) ABSTRACT

A knitting board is provided. The instruction board includes a front side and a back side, each hinged attached to a spine. The hinge attachments will allow the front side and the back side to open into an A-frame. The front side has a window therethrough. The front side has a plurality of connectors at least located above the window. The connectors can moveably secure a plurality of instruction cards thereto. The instruction cards can display a desired topics such as the steps for various knitting techniques, thereon. A card marker located as part of the plurality of instruction cards can mark a place on the instruction card, such as the last place a user was at when they stopped the Instructional board for knitting.

5 Claims, 3 Drawing Sheets

(56) References Cited

U.S. PATENT DOCUMENTS

| | | | | |
|---|---|---|---|---|
| 6,108,953 A * | 8/2000 | Hall | ............ | B42F 21/00 |
| | | | | 281/31 |
| 6,305,714 B1 * | 10/2001 | Rossetto | ............ | B42F 13/0006 |
| | | | | 281/29 |
| 6,413,091 B1 * | 7/2002 | Fields | ............ | G09B 19/20 |
| | | | | 112/439 |
| 6,629,845 B2 * | 10/2003 | Zwiers | ............ | G09B 19/0092 |
| | | | | 434/171 |
| 6,764,372 B1 * | 7/2004 | Rae | ............ | A63H 33/38 |
| | | | | 446/71 |
| 6,966,780 B2 * | 11/2005 | Perry | ............ | B42D 1/001 |
| | | | | 434/322 |
| 6,994,553 B2 * | 2/2006 | DaRif | ............ | G09F 5/04 |
| | | | | 434/98 |
| 7,073,913 B1 * | 7/2006 | Wa | ............ | G03B 21/10 |
| | | | | 353/26 R |
| 7,441,358 B1 * | 10/2008 | Ngan | ............ | G09F 1/10 |
| | | | | 281/33 |
| 7,661,958 B2 * | 2/2010 | Meyer | ............ | G09B 25/04 |
| | | | | 434/72 |
| 7,694,932 B1 * | 4/2010 | Ngan | ............ | G09F 1/06 |
| | | | | 248/461 |
| 9,635,934 B1 | 5/2017 | Norton | | |
| 10,507,682 B2 * | 12/2019 | Sada | ............ | B42F 13/22 |
| 2010/0319407 A1 | 12/2010 | Neralich | | |
| 2012/0178066 A1 * | 7/2012 | Drum | ............ | G09B 17/04 |
| | | | | 434/245 |

* cited by examiner

INSTRUCTIONAL BOARD FOR KNITTING

CROSS REFERENCE TO RELATED APPLICATIONS

This application claims the benefit of U.S. Provisional Application No. 62/865,619 filed on Jun. 24, 2019. The above identified patent application is herein incorporated by reference in its entirety to provide continuity of disclosure.

BACKGROUND OF THE INVENTION

The present invention relates to tools for knitting a desired project. More particularly, the present invention provides an instruction board with a window and a plurality of connectors adjacent to the window which can be used to secure information cards thereto.

Many people enjoy learning new hobbies or adding skills to existing hobbies. While knitting used to be a necessity as many individuals made their own clothes it is now more of a hobby, and one that can be difficult to learn. Knitting requires the use of both hands and one must keep the knitting raw material, such as yarn, properly on the knitting needles. This means that it can be difficult to look at knitting instructions.

Traditional knitting materials include books and videos. Books can be difficult to hold open and to keep the pages open to the proper place while actively knitting. Further it can be difficult to follow along with a book if there is too much information on each page. Videos can be easier to follow and easier to see while knitting; however, videos may need to be rewound depending on how long it takes an individual to learn a stitch and how many times a user needs to watch a specific portion of the video in order to learn a stitch or pattern. Further, it can be difficult to perform the movements to conduct a stitch fast enough to keep up with the video.

Consequently, there is a need for an improvement in the art of following instructions for knitting. The present invention substantially diverges in design elements from the known art while at the same time solves a problem many people face when attempting to lean a new skill. In this regard the present invention substantially fulfills these needs.

SUMMARY OF THE INVENTION

The present invention provides an instructional board for knitting wherein the same can be utilized to teach a user a desired topic, such as how to knit or a new stitch. The instructional board for knitting includes a front side and a planar back side connected by a spine. A first series of a plurality of connectors are attached to a top plane of the planar front side. The planar front side has a window located therethrough.

An object of the instructional board for knitting is to have a second series of a plurality of connectors attached to the top planar front side.

Another object of the instructional board for knitting is to have the planar front side and planar back side connected to the spine such that the planar front side and the planar back side can fold together.

Another object of the instructional board for knitting is to have a plurality of teaching instruction cards removably securable to the first series of the plurality of connectors.

Another object of the instructional board for knitting is to have a plurality of teaching instruction cards removably securable to the second series of a plurality of connectors.

Another object of the instructional board for knitting is to have the first series of a plurality of connectors located above the window.

Another object of the instructional board for knitting is to have the second series of a plurality of connectors located below the window.

Another object of the instructional board for knitting is to have the first series of a plurality of connectors comprising binder rings.

Another object of the instructional board for knitting is to have the second series of a plurality of connectors comprising binder rings.

Another object of the instructional board for knitting is to have at least one place marker is a part of the plurality of instructional cards.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
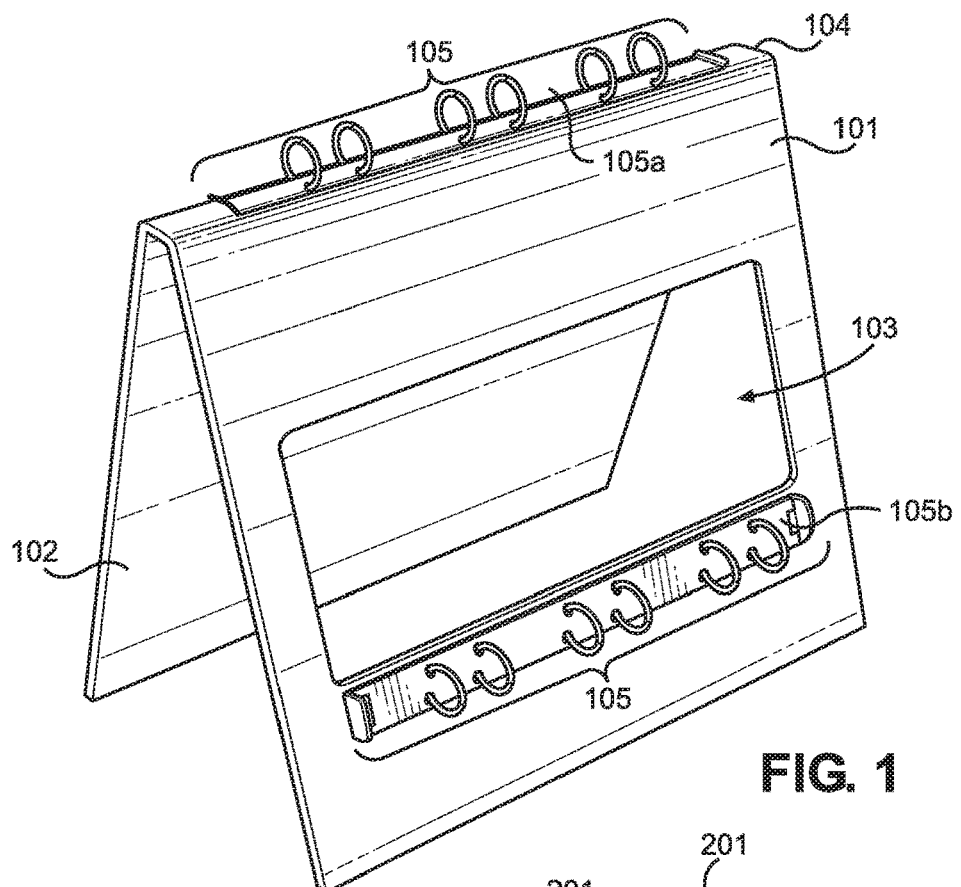
FIG. 1 shows a perspective view of an embodiment of the instructional board for knitting.

Reference is made herein to the attached drawings. Like reference numerals are used throughout the drawings to depict like or similar elements of the instructional board for knitting. For the purposes of presenting a brief and clear description of the present invention, a preferred embodiment will be discussed as used for the instructional board for knitting. The figures are intended for representative purposes only and should not be considered to be limiting in any respect.

Referring now to FIG. 1, there is shown a perspective view of an embodiment of the instructional board for knitting. The instructional board for knitting includes a planar front face 101 and a planar back face 102. In one embodiment, the planar front face 101 and the planar back face 102 are rigid. In such an embodiment, the planar front face 101 and the planar back face 102 can function as supports in order to sit up for ease of use.

In the shown embodiment, a spine 104 is attached to an edge of each the planar front face 101 and the planar back face 102. In one embodiment, the planar front face 101 and the planar back face 102 are hingedly attached to the spine 104. The hinge attachment will allow the planar front face 101 and the planar back face 102 to rotate about the spine 104 thereby enabling the device to open and close. In one embodiment, the hinge attachments will enable the planar front face 101 and the planar back face 102 to be disposed at an angle comprising at between X and Y degrees. In one embodiment, the the planar front face 101 and the planar back face 102 can be disposed at a 180 degree angle relative to each other. In one embodiment, the spine 104 and hinge attachments will allow the instructional board for knitting to open into an A-frame structure.

A window 103 is located in the planar front face 101. The window 103 comprises an opening extending through the planar front face and will allow a user to see into the A-frame structure or other structure created by the planar faces 101, 102 and the spine 104. In one embodiment, the window 103 is located Lower on the planar front face 101 away from the spine 104 and closer to an outer edge. The purpose of the hole is to allow the bottom set of sleeves to turn to the back, when that row has been completed At least one series of connectors 105 are attached to the instructional board for knitting. In one embodiment, a first series of connectors 105a is attached to the spine 104. In another embodiment, the first series of connectors 105a is attached to the planar front face 101 above the window 103, such that an upper edge of the window 103 is positioned beneath the first series of connectors 105a. In another embodiment, a second series of connectors 105b is attached to the front face 101 beneath a lower edge of the window 103. In some embodiments, there are a combination of the first series of connectors 105a and the second series of connectors 105b attached to the instructional board for knitting. In one embodiment, the connectors 105 are binder rings. In another embodiment, the connectors 105 are binder clips. In a further embodiment, the connectors 105 are brass pin connectors.

Figure 2:
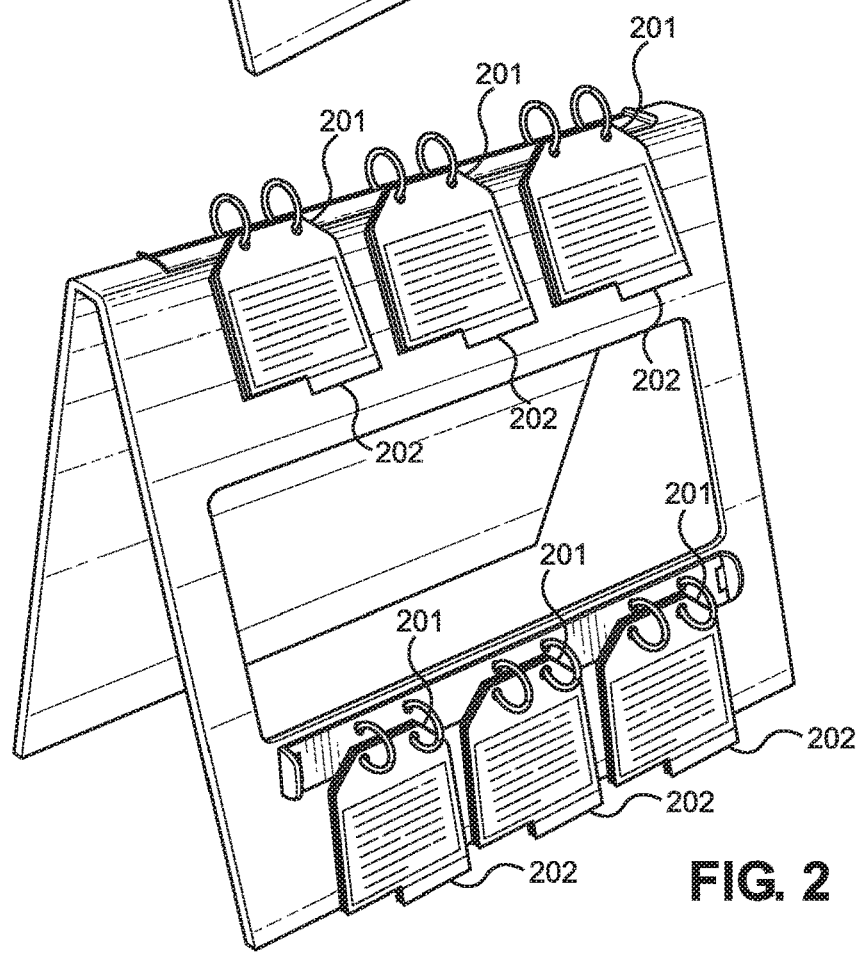
FIG. 2 shows a perspective view of an embodiment of the instructional board for knitting with instruction cards attached.

Referring now to FIG. 2, there is shown a perspective view of an embodiment of the instructional board for knitting with instruction cards attached. A plurality of instruction cards 201 can be attached in various ways to the series of connectors 105. The instruction cards 201 are configured to attach to the connectors 105. In one embodiment, the instruction cards 201 are sized such that they will not overhang the window 103 or the lower edge of the front planar face 101 when secured by the connectors 105. In one embodiment, the instruction cards 201 are paper. In another embodiment, the instruction cards 201 comprise a thin plastic material. In yet another embodiment, the instruction cards 201 are laminated. Within the instruction cards 201 are located place holders 202. In one embodiment the place holders 202 are slightly larger than the instruction cards 201.

Figure 3:
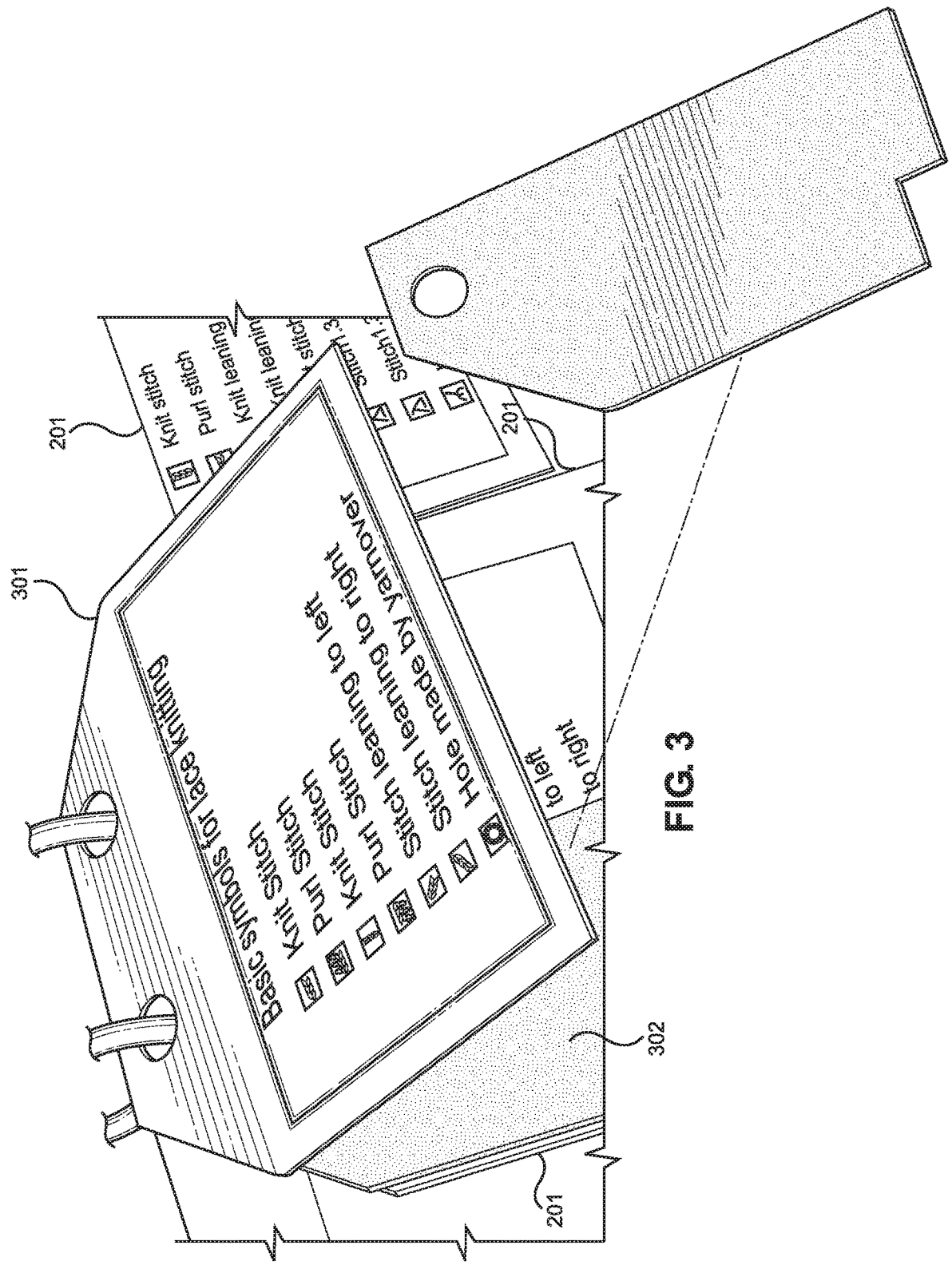
FIG. 3 shows various indicia of sample embodiments of the instruction cards and card markers.

Referring now to FIG. 3, there is shown various indicia of sample embodiments of the instruction cards and card markers. The instruction cards 201 will have various instructions one them. In the shown embodiment, a instruction card 301 has "basic symbols for lace knitting" written on the card 301. The card 301 then lists a plurality of stitches along with specific indicia to go along with that stitch. This information will allow a user to easily be able to determine indicia utilized in further cards 301 which teach steps of how to knit various projects and which stitch to conduct next. The information is further designed to be simple and easy to understand which will aid in the knitting process.

A place holder 302 is shown under the sample instruction card 301. In one embodiment, the place holder 302 is split in half. In another embodiment, the place holder 302 will have a tab that protrudes from a bottom side thereof. In one embodiment, the place holder 302 will have the text "finished" imprinted thereon. In further embodiments, other place holders are included. In another embodiment, at least one place holders 302 will include the text "to be done." This will ensure that a user will know exactly where they left off.

Figure 4:
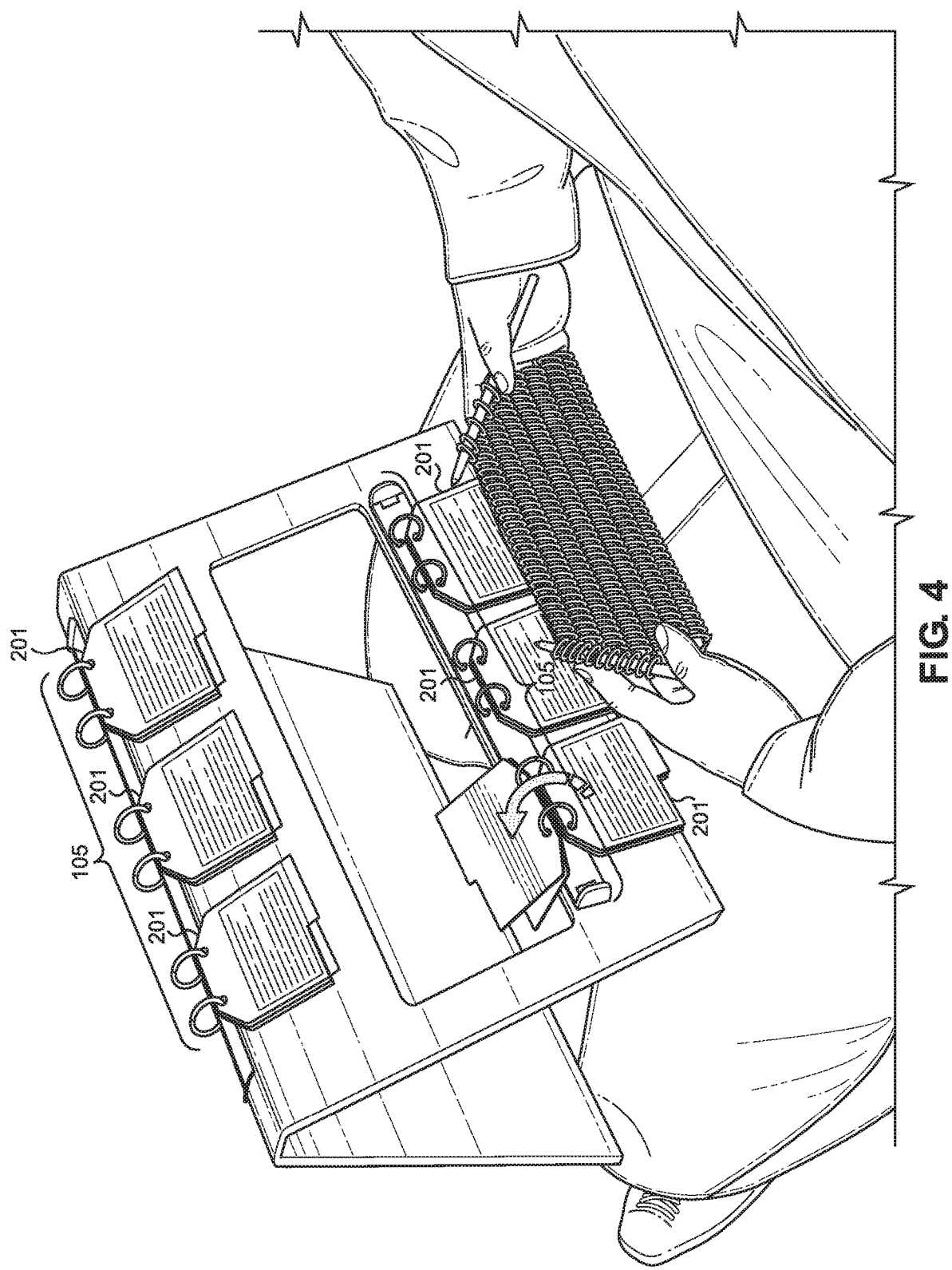
FIG. 4 shows an in-use view of an embodiment of the instructional board for knitting.

Referring now to FIG. 4, there is shown an in-use view of an embodiment of the instructional board for knitting. In use, an individual can place all of the instruction cards 201 to the desired locations on the connectors 105. The user can then read the indicia and instructions on the instruction cards 201 and follow the instructions to perform the knitting project as directed thereby. As shown, the device includes a first grouping of instruction cards removably secured to a first series of a plurality of connectors, wherein each instruction card of the first grouping of instruction cards is sized such that a lower edge of each instruction card terminates above the upper edge of the window, and a second grouping of instruction cards removably secured to the second series of a plurality of connectors, wherein each instruction card of the second grouping of instruction cards is sized such that they can be rotated toward and through the window.

In use, the user can set the instructional board for knitting on their lap in the A-frame configuration. In another embodiment the instruction board for knitting is placed on a table. In yet other embodiments the A-frame is placed on another suitable surface. The user can then read the cards 201 and perform the appropriate steps as shown on the cards 201. When the steps are complete the user can then flip the cards 201 to display the next card.

In one embodiment the instructional board for knitting is used in the following way. First, copy the instructions for Your Project. Some projects have 3 or 4 different patterns. Each pattern has rows that are required to complete the pattern, some could have 17 rows others 44 rows. Put the first pattern rows into a sleeve. Row1, Row 2, 3 etc. until all rows are in a sleeve. Then place all the rows on the rings for the First Pattern. Continue with all the patterns. Cast on the number of stitches the project calls for. On the first row place a marker at the end of each pattern, carry the maker for the completion of the project. As the first row of the first pattern is completed, move the marker to the other needle, flip the sleeve to the back, kit first row on second pattern. When completed, flip to the back. Continue until all first rows are completed. Knit all the second rows, then third rows. As the short patterns are completed, just turn them over to the front and continue. In this way a user will always know where they are.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An instructional board for knitting comprising:

a planar front side and a planar back side connected by a spine;

a first series of a plurality of connectors attached to the spine;

the planar front side has a window located comprising an opening extending therethrough, wherein an upper edge of the window is positioned beneath the first series of a plurality of connectors;

a second series of a plurality of connectors attached to the planar front side beneath a lower edge of the window;

a first grouping of instruction cards removably secured to the first series of a plurality of connectors, wherein each instruction card of the first grouping of instruction cards is sized such that a lower edge of each instruction card terminates above the upper edge of the window;

a second grouping of instruction cards removably secured to the second series of a plurality of connectors, wherein each instruction card of the second grouping of instruction cards is sized such that they can be rotated toward and through the window.

2. The instructional board for knitting of claim 1, wherein the planar front side and planar back side are connected to the spine such that the planar front side and the planar back side can fold together.

3. The instructional board for knitting of claim 1, wherein the first series of a plurality of connectors is binder rings.

4. The instructional board for knitting of claim 1, wherein the second series of a plurality of connectors is binder rings.

5. The instructional board for knitting of claim 1, further comprising at least one place marker within the plurality of teaching instruction cards.

* * * * *